No. 722,779. PATENTED MAR. 17, 1903.
W. W. WATSON.
WIRELESS CHECK ROW CORN PLANTER.
APPLICATION FILED APR. 27, 1901.
NO MODEL. 5 SHEETS—SHEET 1.

Fig. I.

Witnesses
Inventor
W. W. Watson.
Attorneys

No. 722,779. PATENTED MAR. 17, 1903.
W. W. WATSON.
WIRELESS CHECK ROW CORN PLANTER.
APPLICATION FILED APR. 27, 1901.
NO MODEL. 5 SHEETS—SHEET 5.

Witnesses
M. D. Blondel.
C. Shaw.

Inventor
W. W. Watson.
By
Attorneys

THE NORRIS PETERS CO., PHOTO-LITHO., WASHINGTON, D. C.

UNITED STATES PATENT OFFICE.

WILLIAM W. WATSON, OF BALDWIN, IOWA.

WIRELESS CHECK-ROW CORN-PLANTER.

SPECIFICATION forming part of Letters Patent No. 722,779, dated March 17, 1903.

Application filed April 27, 1901. Serial No. 57,731. (No model.)

*To all whom it may concern:*

Be it known that I, WILLIAM W. WATSON, a citizen of the United States, residing at Baldwin, in the county of Jackson and State of Iowa, have invented a new and useful Wireless Check-Row Corn-Planter, of which the following is a specification.

This invention relates generally to planters, and particularly to corn-planters, and is a wireless check-row corn-planter, the object of the invention being to provide a planter which will drop the corn in regular order both longitudinally and transversely and entirely avoid the use of a check-row wire.

Another object of the invention is to provide a corn-planter of this character which shall distinctly mark the ground at each deposit of grain and at the same time produce a gage-mark to guide the operator in laying out the next row.

Another object of the invention is to provide a corn-planter of the character described in which the dropping and marking mechanisms can be adjusted while the machine is at rest or in motion. It is also intended to produce a marking mechanism to be used in connection with a corn-planter, which mechanism can be regulated during the progress of the machine in order to compensate for uneven ground or obstructions.

Other objects and advantages will be apparent hereinafter; and with these various objects in view the invention consists in the various details of construction and also in the novel combinations or arrangements of parts, all of which will be fully described hereinafter, and pointed out in the claims.

In the drawings forming part of this specification.

In carrying out my invention I employ a main frame A, essentially rectangular in shape and mounted upon the axle B, said axle having ground-wheels C mounted upon their outer ends. The ground-wheels C are composed of two sections C', the rims of the sections being inclined toward each other, thereby providing a grooved wheel. The wheels C are loosely mounted upon the axle B, and this axle has ratchet-disks B' mounted thereon, and the inner hub-sections have a series of spring-actuated pawls B², adapted to engage the ratchet-disks and rotate the axle when the machine is being drawn forwardly.

Figures 3, 9, 10, 11, 12, 13, 14:
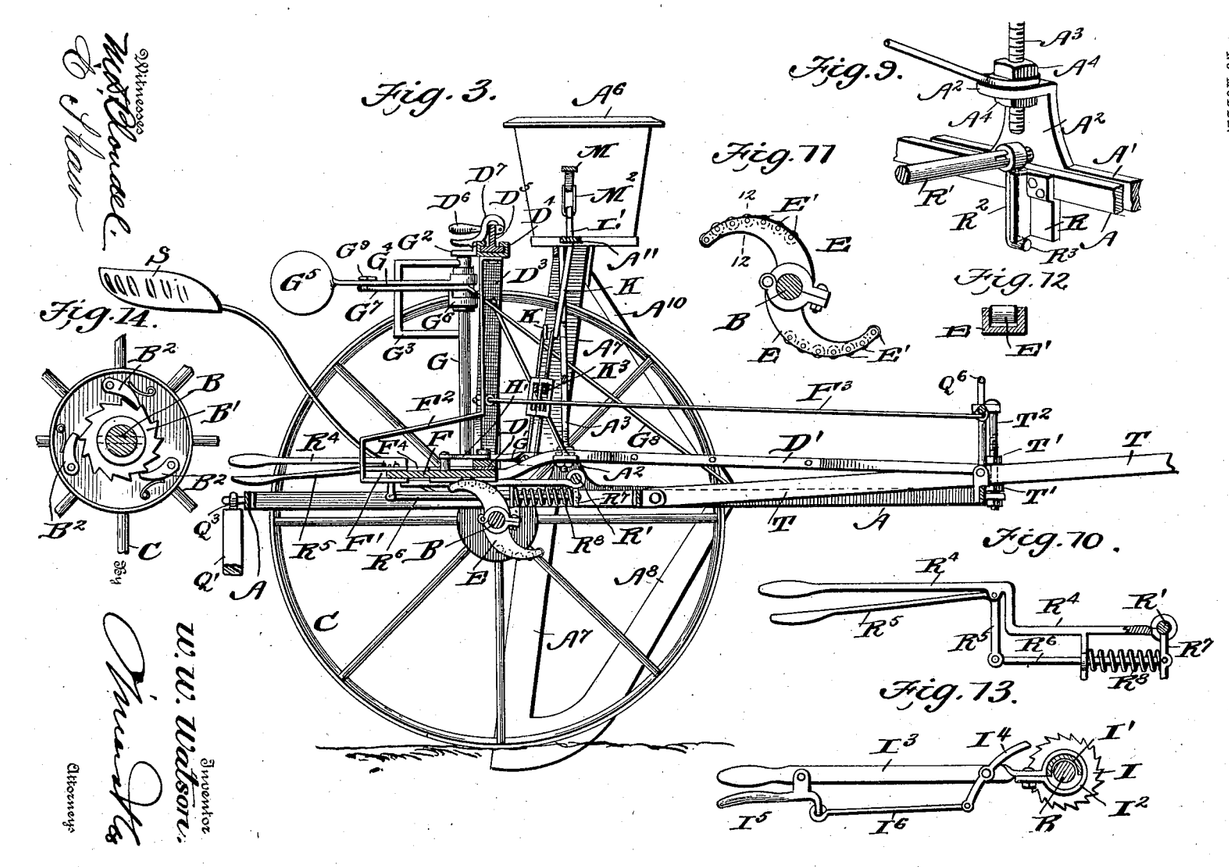
Fig. 3 is a longitudinal section on the line 3 3 of Fig. 2.
Fig. 9 is a detail perspective illustrating the mechanism for locking the movable side beam to the main frame.
Fig. 10 is a detail view of the lever for releasing the said mechanism.
Fig. 11 is a detail view of the wiper arm or wheel.
Fig. 12 is a section on the line 12 12 of Fig. 11.
Fig. 13 is a detail of the mechanism for operating the axle for the purpose of bringing the wiper-arm into any desired position.
Fig. 14 is a detail view of the pawl-and-ratchet mechanism contained within the hub of the ground-wheels.

A series of pawls are employed in order to insure a positive engagement between the wheels and the axle at all times, it being noted by reference to Fig. 14 that one pawl is in engagement, another one partly in engagement, and a third one about to drop into engagement, thereby avoiding all possibility of lost motion. By this construction I am also enabled to make the ratchet-teeth larger, and consequently secure greater strength, thereby lessening the possibility of breakage at this point.

Movable beams A' are pivoted to the side members of the main frame adjacent to the forward end of the same, said beams having inwardly-projecting brackets $A^2$, to which are secured the upright rods $A^3$, the lower ends of said rods being threaded and passing through the brackets $A^2$ and having nuts $A^4$ screwed thereon, thereby securely fastening the upright rods to the movable beams, and by having the lower ends of the rods $A^3$ threaded and working through the nuts $A^4$, I am enabled to adjust the said rods vertically whenever it may be desired.

Figure 1:
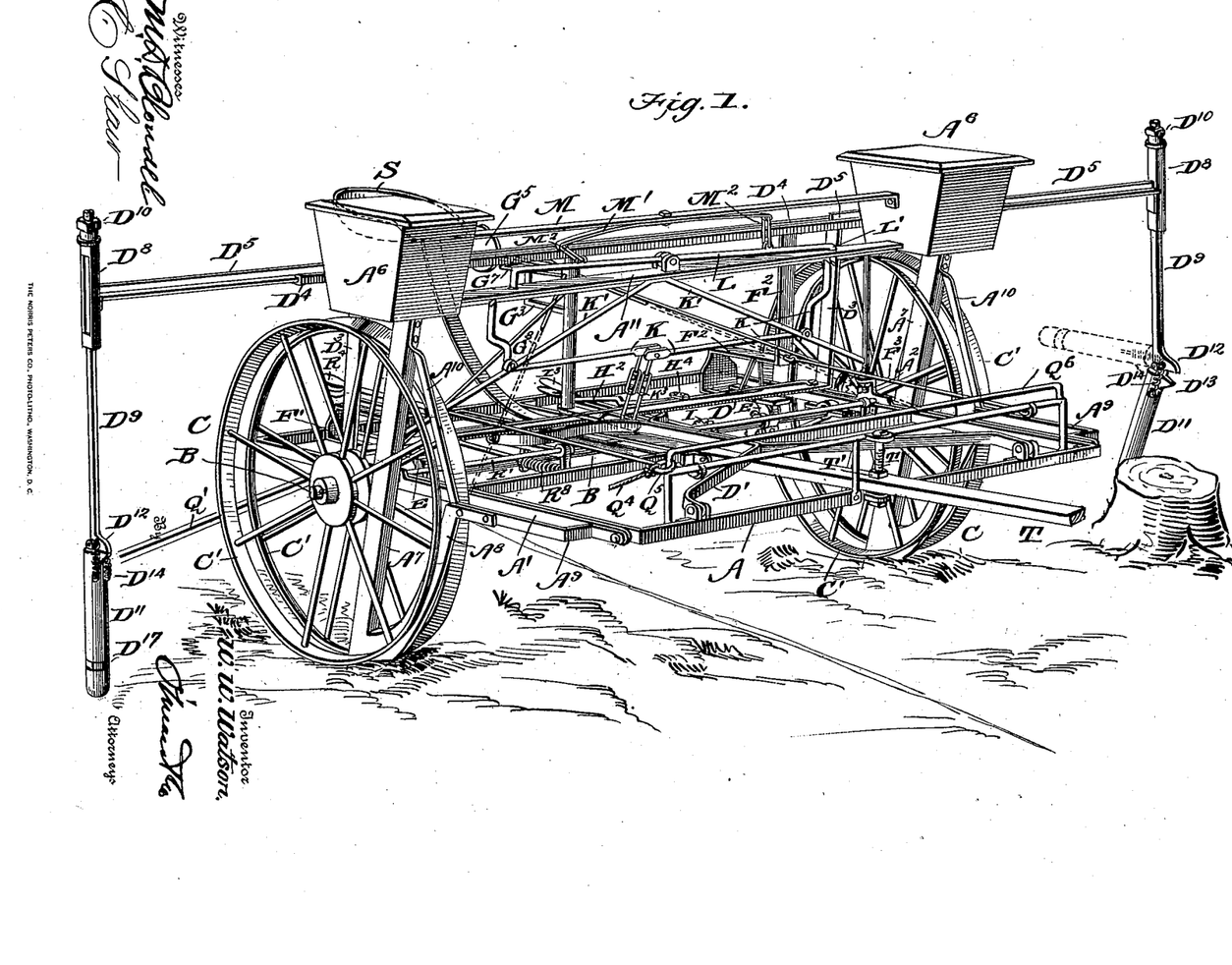
Figure 1 is a perspective view of a corn-planter constructed in accordance with my invention.

The upper ends of the rods $A^3$ are connected to a cross-bar $A^5$, hoppers $A^6$ being arranged at the opposite ends of the bar $A^5$, said hoppers being supported by means of the delivery tubes or chutes $A^7$, the lower ends of which are connected to the runners or furrow-openers $A^8$, the upper ends of the runners being attached to a bar $A^9$, pivotally connected to the movable beam A', and the delivery-tube and runner are also braced by means of a rod $A^{10}$, extending from the upper portion of the runner to the upper portion of the delivery-tube, as most clearly illustrated in Figs. 1 and 3.

$A^{11}$ indicates the reciprocating slide for dropping the corn from the hopper into the delivery-tube, and the manner of operating this slide will be more fully explained hereinafter.

Figure 2:
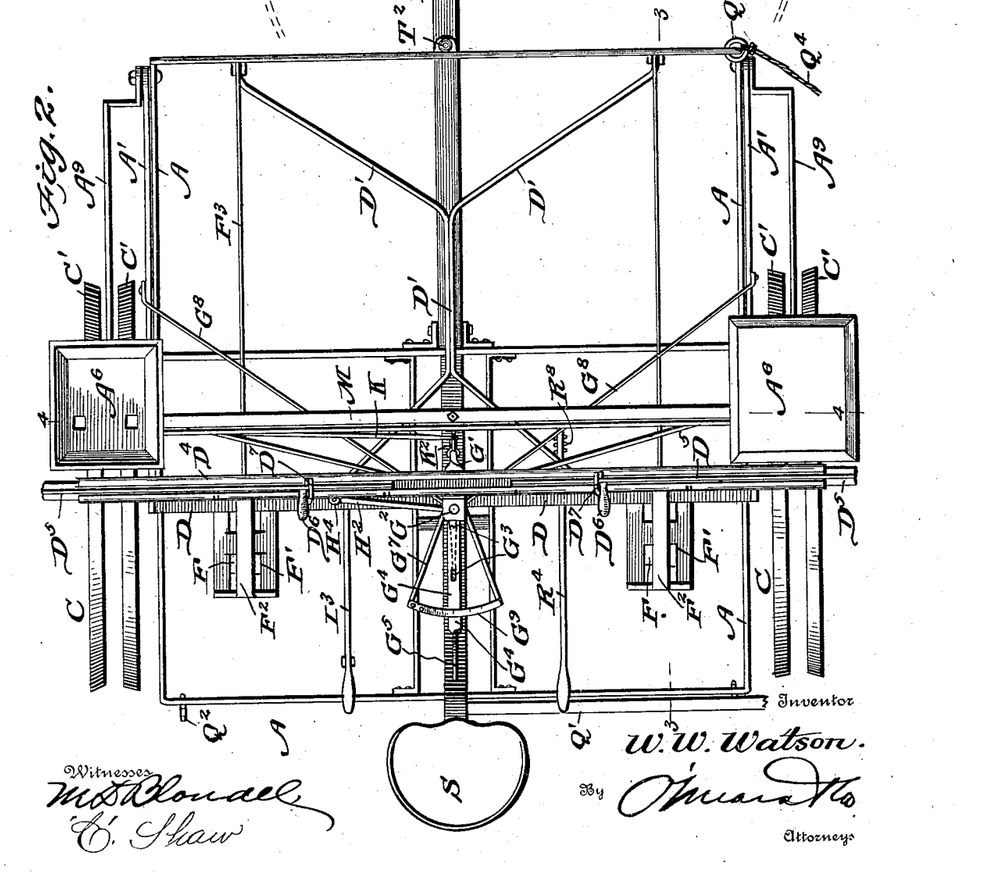
Fig. 2 is a top plan view.

Simultaneous with the dropping of the corn I propose to mark the ground, so that the corn can be planted in the proper and regular manner, and in accomplishing this marking operation I employ a movable frame pivoted to the main frame and carrying the markers, said movable frame being reciprocated as the machine is drawn forwardly, causing the marker to be intermittently forced into the earth for the purpose of producing the mark. This movable frame, heretofore referred to, comprises a cross-beam D, to which are connected the longitudinal bars D', the forward ends of said bars being pivotally connected to the forward member of the main frame, their rear ends being pivotally connected to the cross-beam D, the central portions of the bars D' being brought together, as indicated in Fig. 2, thereby providing an exceedingly light but strong construction of framework.

Upright standards $D^3$ extend upwardly from the ends of the cross-beam D, said standards supporting a cross-bar $D^4$ upon their upper ends, said cross-bar being grooved throughout its entire length and having extensions $D^5$ sliding therein, said extensions being adapted to be moved in or out, as desired, a handle $D^6$ being employed for this purpose. The lateral extensions are also provided with pivotal catches $D^7$, which are adapted to engage notches produced upon the cross-bar $D^4$, said catches being pivoted adjacent to the handle $D^6$, so that it can be lifted out of engagement with the bar whenever it is desired to adjust the extensions.

Figures 15, 16, 17, 18, 19, 20, 21, 22:
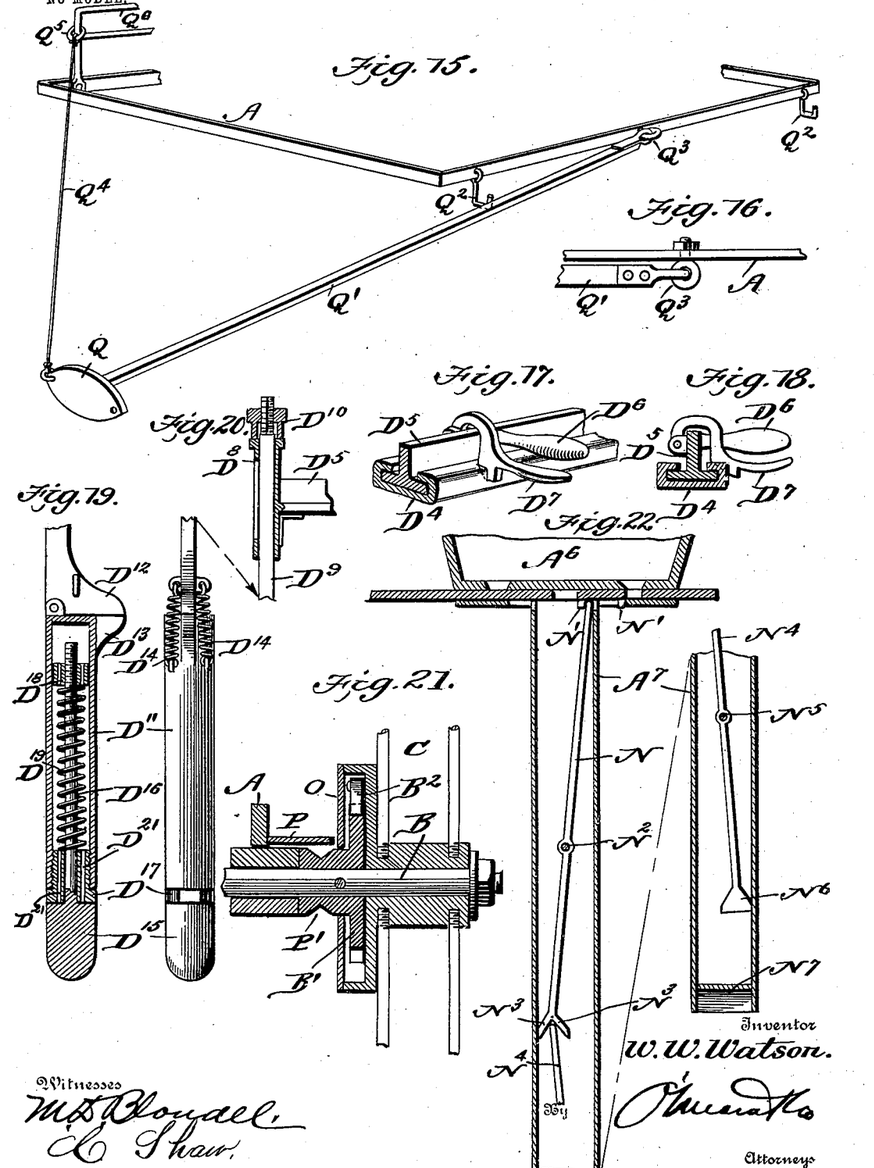
Fig. 15 is a detail perspective illustrating the manner of using the gage-marker.
Fig. 16 is a detail showing the connection of the side gage-marker to the main frame.
Fig. 17 is a detail perspective showing the manner of locking the extension-arms to the movable bar.
Fig. 18 is a sectional view illustrating the same mechanism.
Fig. 19 is a sectional view of the lower section of the marker.
Fig. 20 is a front elevation of the same.
Fig. 21 is a sectional view taken through the hub of one of the bearing-wheels.
Fig. 22 is a sectional view of the delivery-tube, taken at right angles to the section illustrated in Fig. 8.

Sleeves $D^8$ are rigidly attached to the outer ends of the extensions $D^5$, and working in the said sleeves are the upper members $D^9$ of the markers, the sections $D^9$ being square in cross-section to prevent rotation, the upper ends of said sections being threaded to receive the nut $D^{10}$, by means of which the sections are securely fastened in the sleeves, and in order to lock the nut upon the said threaded end I prefer to split the said threaded end, as most clearly shown in Fig. 20. The lower section of the marker $D^{11}$ is hinged to the upper section and is tubular in form, and the lower end of the upper section is formed with a forwardly-projecting foot-piece $D^{12}$, against which a forwardly-projecting lip $D^{13}$ abuts when the lower section $D^{11}$ is in its proper vertical position, said abutting portions $D^{12}$ and $D^{13}$ preventing any forward movement of the lower section; but rear movement of the lower section will be permitted, so that in case the said lower section should meet with any obstruction it will swing backwardly, as most clearly illustrated in Fig. 1, springs $D^{14}$ being employed to connect the upper and lower sections for the purpose of returning the lower section to its normal vertical position. The lower tubular section has a plunger $D^{15}$ connected therewith, said plunger being the portion projected into the ground for the purpose of producing the mark. This plunger has a shank $D^{16}$, which extends up into the tubular member $D^{11}$, passing through the screw-plug $D^{17}$, screwed into the lower end of the tubular portion, the upper end of the shank having a nut $D^{18}$ screwed thereon, and between the screw-plug $D^{17}$ and the nut $D^{18}$ is a spring $D^{19}$, surrounding the shank, the purpose of said spring being to normally hold the plunger in an elevated position, as most clearly shown in Figs. 19 and 20. The screw-plug and nut are formed with openings $D^{21}$ to permit the air to escape during the operation of the marker.

As before described, the bar $D^4$ is supported upon the movable frame, and when the said frame moves up and down the bar $D^4$ will of course move in unison therewith and likewise the markers. For the purpose of producing the marks at regular intervals I propose to elevate the movable frame a certain distance and then permit it to drop rapidly, thereby imparting a rapid descending movement to the markers. This downward movement, however, will be suddenly arrested, and the inertia of the markers will cause the plunger to be projected downwardly against the tension of the spring, thereby causing a mark to be produced in the ground, and as soon as said mark has been produced the spring will immediately restore the plunger to its normal position. It will thus be seen that I employ a plunger which will be automatically returned to its normal position the moment the mark is produced. By having the marker made in sections and permitting the lower one to fold rearwardly all damage to the machine is avoided in case any obstructions are met with. Furthermore, by hinging the lower section in the manner described and connecting the said sections by means of springs I am enabled to turn the lower section completely back, the tension of the spring being sufficient to hold it in that position.

The cross-beam D normally rests upon the rear ends of the movable beams A', and in order to move the said beam, and consequently the movable frame, upwardly I employ the curved wiper-arms E, which are securely clamped upon the axle B, and therefore rotate therewith. These wiper-arms are adapted to strike against the bearing-plates F, held in guideways F', securely fastened to the cross-beam D, bracing-bracket $F^2$ extending upwardly and connected to the cross-bar $D^4$, and a brace-rod $F^3$ extends from the said bracket $F^2$ to the forward portion of the main frame. Overlapping guides $F^4$ hold the bearing-plates upon the guideways F'. These bearing-plates are arranged beneath the cross-beam D, so that when the wiper-arms contact with the plates and lift them the cross-beam D, and consequently the entire movable frame, is elevated. In order to reduce the friction between the wiper-arms and the plates to a minimum, I propose to arrange a series of antifriction-rollers E' in the bearing faces of the wiper-arms, which rollers contact with the bearing-plates, and consequently avoid a great deal of friction. It will be understood that by means of the construction herein shown and described the movable frame will be lifted and dropped twice at each rotation of the axle, and at each dropping of the movable frame the markers will of course be projected into the earth. I also propose to regulate the intervals of the marker and dropping mechanism, and in order to do this the bearing-plates F are made adjustable, so that the wiper-arms are made to contact with said plates for a longer or shorter interval of time, as required. For this purpose the bearing-plates are made movable within the guideways, and in order to adjust the said plates in the proper manner I employ a vertical shaft G, supported at its lower end upon a suitable arm G', its upper end being journaled in the bracket $G^2$, attached to the cross-bar $D^4$. The shaft also has a frame $G^3$ rigid therewith, the vertical member of said frame working through a lever $G^4$, the end of which has a plate $G^5$ arranged thereon, adapted to be held between the knees of the driver and by means of which the lever can be shifted by the pressure of the knee in one direction or the other. The forward end of this lever has a split collar $G^6$, which embraces the shaft G adjacent to the upper end. The rear end of the lever rests upon a horizontal frame $G^7$, which is connected to the brace-rods $G^8$, extending to the movable beams A'. A spring clamping-bar $G^9$ is attached to the frame $G^7$ and serves to hold the lever down upon the frame, and this bar $G^9$ is graduated or has a scale marked thereon, so that the operator can readily adjust the lever to one side or the other a definite distance and know exactly the distance the said parts have been adjusted.

H indicates a horizontal lever pivoted to the cross-beam D adjacent to one end and extending nearly the full length of the beam, the distal end of said lever being connected to the adjacent bearing-plate by means of a link H'.

$H^2$ indicates a rod attached to the shaft G adjacent to its lower end, the free end of said rod being attached to the other bearing-plate by means of a link $H^3$, and the lever H and rod $H^2$ are connected by means of a pivot-link $H^4$, so that the bearing-plates have an equal sliding movement at each partial rotation of the shaft G, it being understood that coupling the lever H and the rod $H^2$ together at the point $H^4$ equalizes the motion imparted to the links H' and $H^3$, thereby causing the bearing-plates to move in unison. By moving the bearing-plates back or forth in the guideways the length of time which the wiper-arms will contact with said side can be regulated so as to cause the movable frame to drop more or less rapidly, as desired.

By means of the knee-lever arranged as described and in connection with the shaft G the operator is enabled to adjust the bearing-plates during the movement of the machine, and in case the marker will not mark true, owing to uneven ground or any other reason, said irregularity may be compensated for by the adjustment of the bearing-plates in one direction or the other, thus enabling the operator to immediately set the machine right the moment he discovers any inaccuracy in its operation.

Figure 4:
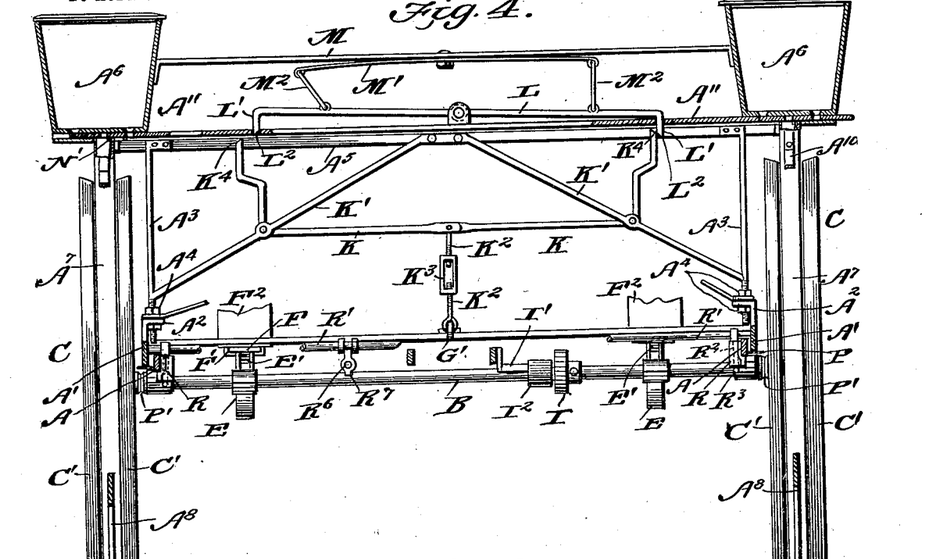
Fig. 4 is a transverse section on the line 4 4 of Fig. 2, illustrating the dropping mechanism, the marking mechanism being purposely omitted for clearness of illustration.
Figures 5, 6, 7:
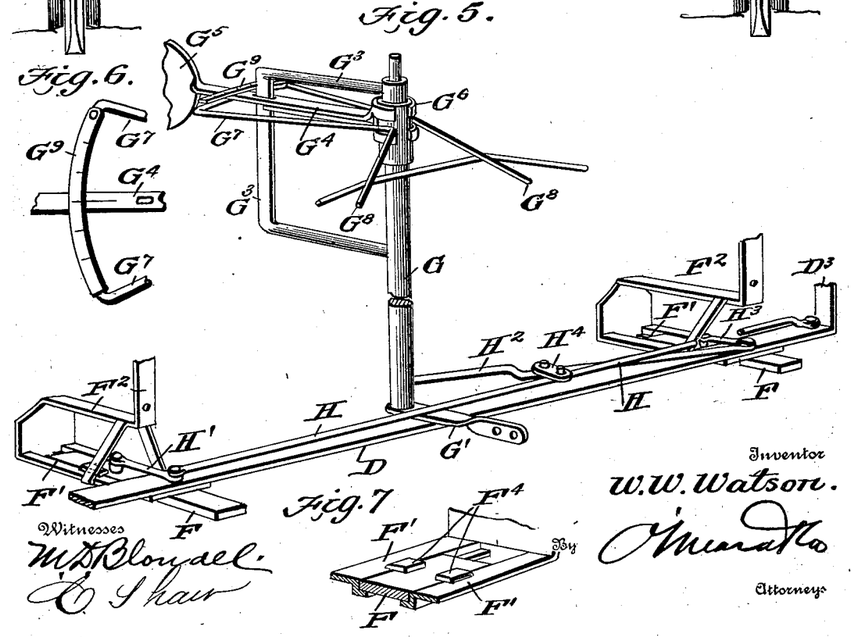
Fig. 5 is a detail perspective illustrating the means of adjusting the bearing-plates to regulate the elevation and time of action of the markers.
Fig. 6 is a detail plan view of the spring-arm for holding the knee-lever in position.
Fig. 7 is a detail sectional perspective showing the manner of guiding the bearing-plates.

In order to permit the wiper-arms to be adjusted while the machine is stationary, I arrange a ratchet-wheel I, Fig. 13, upon the axle B, and adjacent to said wheel is a curved plate I', attached to a portion of the main frame and partially encircling the axle, but not contacting therewith. Around this curved plate I' is fastened the end $I^2$ of the lever $I^3$, having a pawl $I^4$ pivoted thereon and operated by means of the thumb-lever $I^5$ and link $I^6$. By means of the lever carrying the pawl and the ratchet-wheel upon the shaft the operator can rotate the shaft, causing the wiper-arms to be moved to any desired position. This construction and operation enables the operator to start the machine at any desired point and have the dropping and marking mechanism correctly adjusted prior to starting. As before stated, the dropping mechanism is operated simultaneously with the marking mechanism and by means of the movement of the movable frame, and in order to accomplish such operation I employ a pair of elbow-levers K, Fig. 4, pivoted to the brace-rods K', the inner ends of said levers being pivotally connected to links K², having the turnbuckles K³, said links K² being attached to the forward end of the arm G', which, as before stated, is rigidly secured to the cross-beam D.

A rock-bar L is pivoted upon the upper side of the reciprocating slide A¹¹ and is formed with depending ends L', which project through openings produced in the said slide, said ends extending into the path of the upper ends of the levers K, the upper ends of said levers being beveled, as shown at K⁴, and the lower ends of the portions L' are also beveled, as shown at L². A cross-bar M connects the feed-hoppers, and the spring M' is attached to the center of said bar and is connected by means of links M² to the rock-bar L, adjacent to the ends of said bar. By means of the spring and link in connection with the rock-bar one of the depending ends is always projected through the slide and when the movable frame is raised by means of the wiper-arms the elbow-levers are operated so that their upper arms are forced outwardly and the beveled end of one lever contacting with the beveled end of the rock-bar, which projects through the slide, will trip said outwardly-projecting end sufficiently to pass beyond it, and upon the descent of the movable frame the upper ends of the elbow-levers will be brought toward each other and the lever which has just passed beyond the depending end of the rock-bar will operate upon the said end, causing the slide to be moved a certain distance, and consequently the rock-bar. When one end of the rock-bar is projecting through the slide, the link adjacent to the said end is straight or perpendicular, as most clearly shown in Fig. 1, and the other link is oblique or slanting, and during the lateral or shifting motion of the slide the first link, which was perpendicular or straight, becomes inclined and the second one becomes perpendicular or straight, and the force of the spring M' is then exerted to force the adjacent end of the rock-bar down through the slide and raising the opposite end out of the slide. The slides work in guideways in the bottom of the hopper and drop a definite amount of corn or other grain at each reciprocation; but as the feed or dropping operation may be of any desired construction it will not be necessary for me to illustrate or describe any special construction of slide or hopper-bottom. By having the dropping mechanism heretofore described operatively connected with the movable frame and by having the markers operated in exactly the same manner it will be readily understood how a mark will be produced at each deposit of grain. I also prefer to provide against an undue discharge of corn or other grain at the delivery end of the tube, and in order to do this I arrange a series of swinging cut-offs second drop or flirt-valves within the delivery tube or chute, the upper one being operated by the slide, and inasmuch as the series are connected together the operation of the upper one will serve to operate the lower ones, and while I have shown and described only two such cut-offs it will of course be understood that any desired number may be employed. I also prefer to construct the delivery-tube with an inclined bottom for the purpose of projecting the corn or grain directly into the ground at the proper point.

Figure 8:
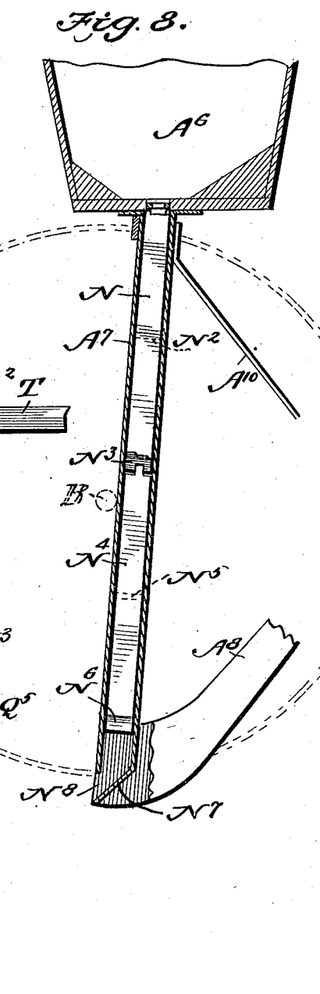
Fig. 8 is a vertical sectional view, taken through the delivery tube or chute, showing the swinging cut-offs, second drop, or flirt-valve.

Referring now to Figs. 8 and 22, N indicates the upper cut-off, operated by means of a lug N', arranged upon the bottom of the slide, the said cut-off being pivoted at N² and having oppositely-disposed flanges N³ at its lower end, thereby forming an inverted-V-shaped groove, into which the upper end of the lower cut-off N⁴ rests, said lower cut-off being pivoted at N⁵ and having the oppositely-disposed flanges N⁶ at its lower end. N⁷ indicates the inclined bottom of the delivery-tube, and N⁸ is the opening through which the corn is discharged. By means of the cut-offs the corn is held one or more times during its passage through the delivery-tube, thereby avoiding all possibility of an accumulated discharge of grain. In order to guard against sand and dirt coming in contact with the pawl-and-ratchet mechanism, Fig. 21, I prefer to arrange them in a suitable casing protected by means of a plate O, and P indicates a sand-band extending over the grooved portion P' of the ratchet-hub, said groove being produced for the purpose of permitting sand and dust to escape readily in case any should fall thereon.

Q, Fig. 15, indicates a gage-runner to produce a continuous mark upon the ground for the purpose of guiding the driver in laying out the next row, said gage-runner being rigidly attached to the outer end of a rod Q', which when turned rests upon a hook Q², depending from the main frame, said rod Q' being swiveled at its inner end, as shown at Q³, so that the rod and gage-runner can be shifted from one side of the machine to the other, and a guy-rope Q⁴ is attached to the forward end of the gage-runner, said rope having a ring Q⁵, which slides upon a guide Q⁶, attached to the forward portion of the main frame. In order to lock the main frame, Fig. 9, and the movable beams A', I employ an angle-bracket R, rigidly attached to the inner side of the side beam of the main frame.

R' indicates a rock-shaft, journaled between the bracket extensions A² and carrying the depending arms R², having foot-pieces R³, which normally rest beneath the angle-bracket R. A lever R⁴, Fig. 10, is attached to the rock-shaft R', said lever having a supplemental hand-lever R⁵, connected to an arm R⁷, rigidly attached to the rock-shaft R', so that when the lever R⁵ is pressed up against the lever R⁴ the rod R⁶ will be operated against the tension of the spring R⁸, rocking the shaft R' through the medium of the arm R⁷. This causes the arm R², with its foot-piece R³, to be withdrawn from engagement with the angle-bracket R. The cross-beam D of the movable frame rests upon the lever R⁴ and by means of which the movable frame can be lifted. After the movable frame has been lifted the lever R⁵ is released, permitting the foot-piece R³ to spring forwardly and rest upon the angle-bracket R, thereby holding the movable frame in an elevated position, so that the wiper-arms will not contact with the bearing-plates, and whenever it is desired to move the machine from place to place without planting the movable frame is elevated and held so by the mechanism just described. The seat S is suitably supported from the rear portion of the main frame, and the tongue T is pivoted at its rear end to a cross-bar of the main frame and is adjustable vertically by means of nuts T', arranged upon a bolt T², held in proper position at the center of the front cross-beam of the main frame, the said bolt passing through a slot produced in the tongue, and by moving the nuts up or down the tongue can be raised or lowered to accommodate teams of different heights.

In operation the planter is driven down the field, planting two rows at one time, and as each hill of corn is dropped the markers will automatically produce marks at each side of the planter, the distance of such marks being regulated by the lateral extension of the movable bar. The gage-runner will also produce lines down the field, which will serve as a guide or gage line in laying out the next row. The split wheels protect the shoes or runners and delivery-chutes, and by arranging the tubes and shoes in this manner it will not be necessary to lift the front part of the planter, as is now commonly done with most planters in use. When the end of the row is reached, the planter is turned around and the gage-runner reversed. One of the markers is supposed to retrace the marks it has just made, and the operator can easily set the machine at the proper point before starting by operating the hand-lever I³. The machine is then ready to be started down the second row, and, as before stated, one of the markers must retrace its former marks while the marker is producing new marks, which it will retrace later. Should the operator notice that the marker is falling short of its mark or going too far, owing to any unevenness of the ground, he can immediately compensate for the difference by shifting the knee-lever G⁴, thereby regulating the positions of the bearing-plates F to drop the markers at the proper instant, as it will be remembered that the adjustment of the bearing-plates can take place while the machine is in motion, as the positions of the dropping and marking mechanisms have no effect upon the regulation or adjustment of these plates, but, on the contrary, the adjustment or regulation of the plates govern the movement of the movable frame, and consequently the marking and dropping mechanisms and operations.

The tongue can be raised or lowered to accommodate teams of different heights, and the movable frame can be raised whenever desired, thereby lifting the bearing-plates out of the path of the wiper-arms and preventing the operation of the marking and dropping mechanisms. This is desirable when the machine is being moved from place to place and is not planting. The markers do not contact with the ground except when the plunger is projected into the ground, and this plunger is immediately returned to its normal position. The markers are also made in sections and the lower one hinged to swing rearwardly, so that when an obstruction is encountered the said section will swing back, and thus save the machine from damage. This construction enables the machine to be driven in a straight line, as it is not necessary to turn out of the way to avoid obstructions.

All the other operations of the various parts have been fully described in connection with the description of the construction, and the advantageous points of such construction and operation having been fully set forth it will not be necessary to mention them at this time. It will be noted, however, that I produce a planter in which the marking and dropping operations are simultaneously accomplished and that the marks will be accurately placed. It will also be apparent that the mechanisms are such that the machine can be made to accurately retrace its marks and that provision has also been made for making corrections and variations during the operation of the machine. Furthermore, the machine is exceedingly light, strong, and durable, and all of its parts are so constructed and arranged that repairs and adjustments can be quickly and easily made whenever necessary.

Having thus fully described my invention, what I claim as new, and desire to secure by Letters Patent, is—

1. In a planter the combination with a movable bar, of markers depending from each end, said markers having plungers in their lower ends adapted to be projected into the ground upon the sudden interruption of said movable bar in its descent, substantially as shown and described.

2. In a planter the combination with a movable bar, of markers depending from each end, and the spring-supported plungers located at the lower ends of the markers, projected into the ground upon the sudden interruption of the movable bar in its descent, substantially as shown and described.

3. In a planter the combination with a movable bar, of the depending markers at each end, said markers being made in sections hinged together, the lower sections carrying spring-supported plungers adapted to be projected into the ground at regular intervals on the sudden interruption of said bar in its descent, substantially as shown and described.

4. In a planter the combination with a movable longitudinally-adjustable bar, of the depending markers attached to the extensions, said markers having spring-supported plungers adapted to be projected into the ground, substantially as shown and described.

5. In a planter, the combination with a movable frame and a longitudinally-adjustable bar carried by said frame, of the depending markers attached to said extensions, the markers consisting of two sections hinged together, each lower section having a spring-supported plunger arranged therein, said plunger being adapted to be projected into the ground at regular intervals, substantially as described.

6. In a planter, the combination with the main frame, of a movable frame pivoted thereto and an adjustable bar carried by said movable frame, the depending markers attached to said extensions, each marker having a spring-supported plunger adapted to be projected into the ground upon the downward movement of a movable frame, substantially as described.

7. The combination with the main frame carrying the seed-hoppers, of a movable frame pivoted to the main frame and adapted to be moved up and down, said movable frame having a horizontal longitudinally-adjustable bar, markers depending from the end of said bar, each marker having a spring-supported plunger arranged at its lower end, which plunger is adapted to be projected into the ground upon a sudden interruption in the downward movement of the movable frame, and means carried by the movable frame for operating the feed mechanism of the seedbox, substantially as set forth.

8. The combination with a main frame, of a movable frame, pivoted thereto having a horizontal longitudinal adjustable bar, depending markers arranged at the ends of said bar, and means connected to the axle of the main frame adapted to vertically reciprocate the movable frame and to project the markers into the ground on the downward movement of the movable frame.

9. The combination with the main frame, of a movable frame pivoted thereto and having a horizontal bar supporting markers, means arranged upon the axle of the main frame for elevating the movable frame, said movable frame being provided with adjustable means for regulating the time of elevation and drop of the said movable frame, substantially as described.

10. The combination with the main frame, of a vertical frame pivoted thereto, a horizontal bar mounted across said frame, and marking devices supported by said bar, a bearing-plate attached to said pivoted frame and a wiper-arm fastened to the axle of vehicle for vibrating said frame, and engaging with said bearing-plate, substantially as described.

11. The combination with the main frame, of a movable frame pivoted thereto, said movable frame having horizontal bar supporting the markers, the wiper-arms arranged upon the axle of the main frame and the adjustable bearing-plates carried by the movable frame and adapted to engage the wiper-arm, and elevate the movable frame, substantially as described.

12. The combination with the main frame, of the horizontal frame pivoted thereto and having a horizontal bar supporting the markers, the wiper-arm carried by the axle of the main frame, the bearing-plates carried by the movable frame and adapted for engagement with the wiper-arms, and means for adjusting the said bearing-plates and regulating the elevation of the movable frame, substantially as described.

13. The combination with the main frame, of the movable frame pivoted thereto having a horizontal bar supporting markers, the wiper-arms arranged upon the axle of the main frame, the bearing-plates carried by the movable frame and means for simultaneously adjusting the bearing-plates from a central point, substantially as shown and described.

14. The combination with a main frame, of seedboxes thereon, a movable frame, markers supported thereby, suitable feed mechanism, means attached to the movable frame adapted to actuate the feed mechanism when the frame is raised, wiper-arms, adjustable bearing-plates carried by the movable frame adapted to engage the wiper-arms and raise the movable frame, the said markers being adapted to project into the ground when the frame is lowered.

15. The combination with the main frame, carrying the seedbox, of the movable frame pivoted thereto and carrying the markers, wiper-arms arranged upon the axle of the main frame, adjustable bearing-plates carried by the movable frame and adapted to contact with the wiper-arms, means attached to the movable frame for operating the feed mechanism, and the lever mechanism for simultaneously adjusting the bearing-plates and regulating the rise and fall of the movable frame.

16. The combination with the main and movable frames, of the seedbox carried by the main frame, and the markers carried by the movable frame, the wiper-arms arranged upon the axle of the main frame, bearing-plates carried by the movable frame, the reciprocating slides arranged upon the main frame and adapted to feed the grain to the delivery-tubes, shifting-levers for reciprocating the slide and the connections between the said levers and the movable frame, substantially as shown and described.

17. In a planter the marker comprising the upper and lower sections hinged together, the lower end of the upper section having the foot-piece adapted to limit the forward movement of the lower section, and the springs connecting the adjacent ends of the said upper and lower sections, said springs normally holding the lower section in a vertical position but permitting it to swing rearwardly when an obstruction is encountered, substantially as described.

18. The combination with the knee-lever, of a vertical shaft having a frame attached thereto, said frame being movable vertically in the knee-lever, the movable frame to which the shaft is attached, means for vibrating said frame, the bearing-plates carried by the said movable frame against which said means contact and means connected to said rotating vertical shaft for adjusting said bearing-plates, to vary the extent of movement of the frame, substantially as described.

19. The combination with the knee-lever, of a vertical shaft having a frame attached thereto, said frame being movable vertically in the knee-lever, the movable frame to which the shaft is attached, the bearing-plates carried by the said movable frame, and the levers for shifting the said plates, said levers being operatively connected to the rotating shaft, substantially as described.

20. The combination with the main frame, having a rest-bracket attached thereto, of the movable beams pivotally attached to the sides of the main frame, a movable frame pivoted to the main frame and resting upon the movable beams, a rock-shaft having a depending arm, said arm having a foot-piece adapted to rest beneath or upon the rest-bracket, and the lever for locking the shaft and operating-arm, substantially as described.

21. In a planter, a marker comprising the tubular member, a plunger having a shank extending into the tubular member, said shank passing through a plug screwed into the end of the tubular member and carrying a nut at its upper end and a spring surrounding the shank of the plunger and arranged between the plug and the nut, substantially as described.

22. In a planter, a marker comprising a tubular member, a plunger having a shank extending into the said member, a plug for closing the end of the tubular member and through which the shank passes, a nut arranged on the end of the shank, a spring surrounding the shank and arranged between the nut and plug, said nut and plug having perforations to permit the escape of air, substantially as described.

23. In a planter, the combination with the markers, of the guide-sleeves, in which the upper ends of the markers rest, the upper ends of the markers being reduced and threaded, said threaded portion being split longitudinally, and a nut screwed upon the said split and threaded portion, substantially as shown and described.

24. The combination with a vertically-vibrating frame, a bearing-plate carried by said frame and a cam-wheel mounted on the shaft of the vehicle vibrating said movable frame, of a lever connected to the said bearing-plate adapted to regulate the vibrations of said frame.

WILLIAM W. WATSON.

Witnesses:
CHAS. E. BROCK,
OLEN O. WATSON.